(12) United States Patent
Kim et al.

(10) Patent No.: US 8,889,073 B2
(45) Date of Patent: Nov. 18, 2014

(54) APPARATUS FOR RECOVERING RESIDUAL SALT FROM THE REDUCED URANIUM METAL

(75) Inventors: Ik-Soo Kim, Daejeon (KR); Sun-Seok Hong, Daejeon (KR); Jin-Mok Hur, Seoul (KR); Hansoo Lee, Daejeon (JP)

(73) Assignees: Korea Atomic Energy Research Institute (KR); Korea Hydro and Nuclear Power Co., Ltd. (KR)

( * ) Notice: Subject to any disclaimer, the term of this patent is extended or adjusted under 35 U.S.C. 154(b) by 406 days.

(21) Appl. No.: 13/221,569

(22) Filed: Aug. 30, 2011

(65) Prior Publication Data
US 2012/0244041 A1    Sep. 27, 2012

(30) Foreign Application Priority Data

Mar. 25, 2011    (KR) .................. 10-2011-0026909

(51) Int. Cl.
*G01N 31/12*    (2006.01)
*G21C 19/42*    (2006.01)
*G21C 21/02*    (2006.01)

(52) U.S. Cl.
CPC ............... *G21C 21/02* (2013.01); *G21C 19/42* (2013.01)
USPC ............................................ 422/78; 422/145

(58) Field of Classification Search
USPC .................... 422/78, 130, 131, 145
See application file for complete search history.

(56) References Cited

U.S. PATENT DOCUMENTS

| 3,986,835 | A | * | 10/1976 | Takagi ............................ 422/71 |
| 2003/0157721 | A1 | * | 8/2003 | Turner et al. .................... 436/34 |
| 2008/0214886 | A1 | * | 9/2008 | Franklin et al. ................. 588/19 |

FOREIGN PATENT DOCUMENTS

| JP | 08-054493 | 2/1996 |
| JP | 11-118982 | 4/1999 |
| JP | 2002-055196 | 2/2002 |
| JP | 2004-069383 | 3/2004 |

* cited by examiner

*Primary Examiner* — Jill Warden
*Assistant Examiner* — Dwayne K Handy
(74) *Attorney, Agent, or Firm* — Workman Nydegger

(57) ABSTRACT

Disclosed herein is an apparatus for recovering residual salt from the reduced uranium metal. The apparatus comprising: an evaporating chamber accommodating mixed molten salt or a reduced uranium metal; a heating furnace surrounding the evaporating chamber to heat the mixed molten salt in the evaporating chamber; an insulator disposed over the evaporating chamber to block heat generated from the evaporating chamber, and including an evaporating pipe in a center thereof to move vapor generated from the evaporating chamber; a receiver disposed over the insulator to collect powder formed by condensing and solidifying vapor passing through the evaporating pipe; and a condenser disposed over the receiver to prevent the vapor passing through the evaporating pipe from leaking out of the apparatus.

9 Claims, 5 Drawing Sheets (a)

(b)

(c)

(d)

(e)

(a)

(b)

APPARATUS FOR RECOVERING RESIDUAL SALT FROM THE REDUCED URANIUM METAL

CROSS-REFERENCES TO RELATED APPLICATION

This patent application claims the benefit of priority under 35 U.S.C. §119 from Korean Patent Application No. 10-2011-0026909 filed on Mar. 25, 2011, the contents of which are incorporated herein by reference.

BACKGROUND OF THE INVENTION

1. Field of the Invention

The present disclosure relates to an apparatus for recovering residual salt from the reduced uranium metal.

2. Description of the Related Art

The Korea Atomic Energy Research Institute (KAERI) researches and develops pyroprocessing process which is a technology that recovers valuable resources such as uranium from the spent fuel. The recovered resources are recycled into fuel for next-generation sodium fast reactors, resulting in increased uranium usage efficiency and a marked decrease in radiotoxicity and the amount of radioactive waste generated, thereby increasing the safety and economic efficiency.

The KAERI pyroprocessing starts from an electrolytic reduction process in which the spent oxide fuel is reduced into a metal with an electrochemical method. The metal formed in the electrolytic reduction process is used as a feed of an electrolytic refining process as the next process, to thereby selectively recover high purity uranium. The electrolytic reduction process and the electrolytic refining process, which are electrochemical processes, use molten salt as an electrolyte medium. The electrolytic reduction process uses molten lithium chloride (LiCl) salt with small amount of $Li_2O$, and the electrolytic refining process uses eutectic salt of LiCl and potassium chloride (KCl). Thus, in order to increase the level of connectivity between the electrolytic reduction process and the electrolytic refining process, it is important to remove the residual LiCl from the metal reduced in the electrolytic reduction process to maintain the composition of LiCl—KCl salt in the electrolytic refining process.

To this end, the present inventors disclose an apparatus that quickly cools LiCl vapor below its melting point to form powder, thereby recovering pure LiCl from mixed molten salt or a uranium metal reduced in the electrolytic reduction process.

SUMMARY OF THE INVENTION

Embodiments of the present invention are directed to provide an apparatus for recovering residual salt from the reduced uranium metal.

According to an aspect of the present invention, there is provided an apparatus for recovering residual salt from the reduced uranium metal, the apparatus including: an evaporating chamber accommodating mixed molten salt or a reduced uranium metal; a heating furnace surrounding the evaporating chamber to heat the mixed molten salt in the evaporating chamber; an insulator disposed over the evaporating chamber to block heat generated from the evaporating chamber, and including an evaporating pipe in a center thereof to move vapor generated from the evaporating chamber; a receiver disposed over the insulator to collect powder formed by condensing and solidifying vapor passing through the evaporating pipe; and a condenser disposed over the receiver to prevent the vapor passing through the evaporating pipe from leaking out of the apparatus.

The mixed molten salt or the reduced uranium metal includes lithium chloride (LiCl).

The evaporating chamber may include a thermocouple to measure a temperature of the evaporating chamber.

The evaporating chamber may include a container containing the mixed molten salt or the reduced uranium metal.

The receiver may include a thermocouple to measure a temperature of the receiver.

The condenser may be provided with a pipe to connect a vacuum pump to the condenser, and air-tightly seal the apparatus.

The vacuum pump may be provided with a valve to control a movement of vapor by a predetermined degree of vacuum (pressure).

The pipe may include a pressure gauge and a filter.

The apparatus may further include cone-shaped baffles that is disposed in an upper portion of the condenser to sufficiently cool vapor, prevents powder from being formed on an upper end of the condenser, and sufficiently cools vapor generated from the evaporating chamber to prevent the vapor from arriving at a vacuum pump.

The apparatus may further include a glove box to recover powder collected within the receiver in inert atmosphere.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Figure 1:
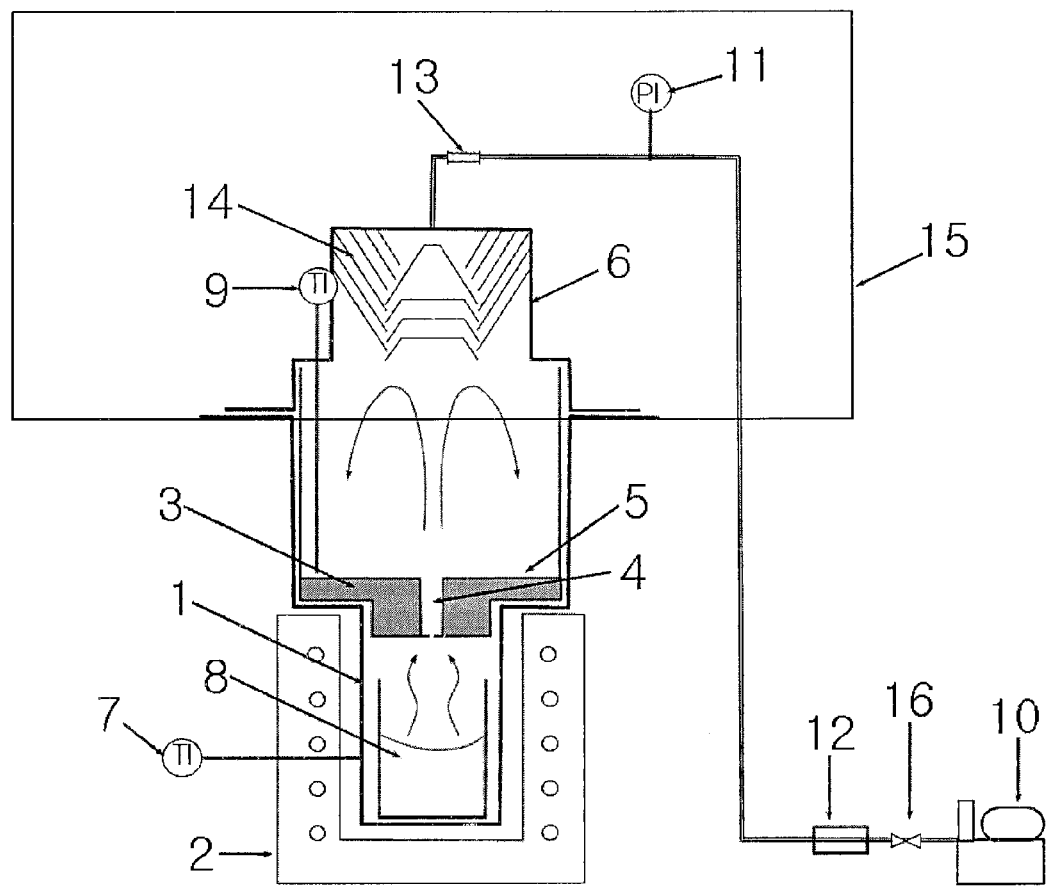
FIG. 1 is a schematic view illustrating an apparatus for recovering residual salt from the reduced uranium metal according to an embodiment of the present invention.

Features and advantages of the present invention will be more clearly understood by the following detailed description of the present preferred embodiments by reference to the accompanying drawings. It is first noted that terms or words used herein should be construed as meanings or concepts corresponding with the technical sprit of the present invention, based on the principle that the inventor can appropriately define the concepts of the terms to best describe his own invention. Like reference numerals refer to like elements throughout. Also, it should be understood that detailed descriptions of well-known functions and structures related to the present invention will be omitted so as not to unnecessarily obscure the important point of the present invention.

Hereinafter, specific embodiments of the present invention will be described in detail with reference to the accompanying drawings.

A spent oxide fuel is reduced into a metal in an electrolytic reduction process using molten salt of LiCl as an electrolyte medium, and the metal includes about 20% residual molten salt of LiCl. Powder of LiCl recovered by an apparatus for recovering residual salt from the reduced uranium metal according to an embodiment of the present invention can be reused in an electrolytic reduction process. Since LiCl has a high melting point of about 605° C. and a low vapor pressure, high temperature and low pressure are needed to distill LiCl.

FIG. 1 is a schematic view illustrating an apparatus for recovering residual salt from the reduced uranium metal according to an embodiment of the present invention.

Referring to FIG. 1, the apparatus includes an evaporating chamber 1, a heating furnace 2, an insulator 3, a receiver 5, and a condenser 6. In detail, the evaporating chamber 1 accommodates mixed molten salt or a uranium metal reduced from a spent nuclear fuel. The mixed molten salt or the reduced uranium metal includes lithium chloride (LiCl). The heating furnace 2 surrounds the evaporating chamber 1 to heat the mixed molten salt or the reduced uranium metal in the evaporating chamber 1. The insulator 3 is disposed over the evaporating chamber 1 to block heat generated from the evaporating chamber 1, and includes an evaporating pipe 4 in the center thereof to move vapor generated from the evaporating chamber 1. The insulator 3 makes a large temperature difference between the evaporating chamber 1 and the condenser 6 to increase supersaturation of LiCl vapor, so that fine white powder of LiCl can be collected. The receiver 5 is disposed over the insulator 3 to collect powder formed by condensing and solidifying vapor passing through the evaporating pipe 4. The condenser 6 is disposed over the receiver 5 to prevent vapor passing through the evaporating pipe 4 from leaking out of the apparatus.

The evaporating chamber 1 and the receiver 5 may include thermocouples 7 and 9, respectively, to measure temperature of the evaporating chamber 1 and the receiver 5. The evaporating chamber 1 may include a container 8 containing the mixed molten salt. A part contacting the mixed molten salt may be formed of an Inconel material (an Fe—Ni—Cr-based cast alloy) having excellent corrosion resistance. The container 8 contains the mixed molten salt. The heating furnace 2 heats the mixed molten salt, and a vacuum pump 10 connected to the condenser 6 depressurizes the mixed molten salt, thereby evaporating LiCl from the mixed molten salt.

The condenser 6 may be provided with a pipe 13 to connect the vacuum pump 10 to the condenser 6, may air-tightly seal the apparatus, and be depressurized to evaporate LiCl. The pipe 13 may be provided with a pressure gauge 11 to measure and control a pressure variation and a depressurization condition. The vacuum pump 10 is provided with a valve 16, so that vapor generated from the evaporating chamber 1 is moved to the condenser 6 by a predetermined degree of vacuum (pressure), and the moving of the vapor is controlled by the valve 16. The pipe 13 may be provided with a filter 12 to prevent LiCl vapor from being introduced to the vacuum pump 10.

Baffles 14 having a cone shape may be disposed in the upper portion of the condenser 6. The baffles 14 sufficiently cools LiCl vapor, prevents LiCl powder from being formed on the upper end of the condenser 6, and sufficiently cools vapor generated from the evaporating chamber 1 to prevent the vapor from arriving at the vacuum pump 10.

The apparatus may include a glove box 15 to recover powder collected within the receiver 5 in inert atmosphere, thereby safely collecting LiCl having deliquescence. LiCl having deliquescence absorbs moisture from air, and dissolves in the absorbed water to form a solution that is difficult to handle. A material contacting the solution is susceptible to contamination and corrosion. Thus, the glove box 15 prevents contamination and corrosion in inert atmosphere such as argon atmosphere, and recovers pure LiCl powder. However, the present invention is not limited thereto, provided that inert atmosphere is maintained in the apparatus, and pure LiCl powder is recovered.

A process using the apparatus to recover LiCl powder from the reduced uranium metal will now be described.

Mixed molten salt of LiCl or a uranium metal reduced from a spent nuclear fuel is accommodated in the evaporating chamber 1. Then, the receiver 5 and the condenser 6 are installed on the evaporating chamber 1. Then, the condenser 6 is connected to the vacuum pump 10 through the pipe 13. It is checked using the vacuum pump 10 and the pressure gauge 11 whether the apparatus is air-tightly sealed. Then, the evaporating chamber 1 is heated using the heating furnace 2 surrounding the evaporating chamber 1 until an inner temperature of the evaporating chamber 1 is about 850° C. or higher, so as to melt the mixed molten salt of LiCl, or LiCl included in the reduced uranium metal. When the inner temperature of the evaporating chamber 1 is constant at the predetermined temperature, the vacuum pump 10 is operated, and the valve 16 of the vacuum pump 10 is opened to evaporate LiCl in the evaporating chamber 1. LiCl vapor is moved upward to the condenser 6 through the evaporating pipe 4 to form LiCl powder that is collected in the receiver 5. At this point, the temperature of the receiver 5 is increased by the heat of sublimation generated when the LiCl vapor is transformed to the LiCl powder. A time taken for evaporating the mixed molten salt of LiCl is proportional to the amount of LiCl included in the mixed molten salt or the reduced uranium metal. When the increased temperature of the receiver 5 begins to decrease, the evaporation of the mixed molten salt is completed. Then, power supplied to the heating furnace 2 is cut off, and the apparatus is cooled down to room temperature. After that, the condenser 6 and the receiver 5 are removed to recover the LiCl powder collected in the receiver 5.

FIGS. 2A to 2E are images illustrating an apparatus for an apparatus for recovering residual salt from the reduced uranium metal according to an embodiment of the present invention.

Figure 2:
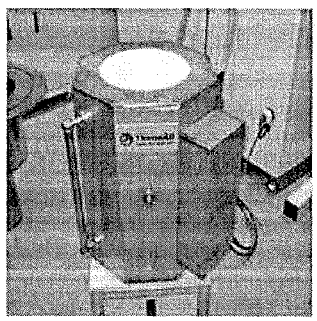
FIGS. 2A to 2E are images illustrating an apparatus for recovering residual salt from the reduced uranium metal according to an embodiment of the present invention.
Figure 2:
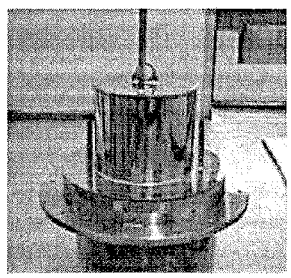
Figure 2:
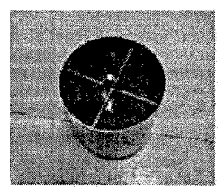
Figure 2:
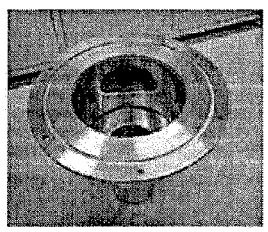
Figure 2:

A heating furnace is illustrated in FIG. 2A. The apparatus including a condenser in the upper portion thereof is illustrated in FIG. 2B. A receiver provided with an evaporating pipe and an insulator is illustrated in FIG. 2C. An evaporating chamber in which the container is accommodated is illustrated in FIG. 2D. The apparatus including a glove box is illustrated in FIG. 2E.

Figure 3:
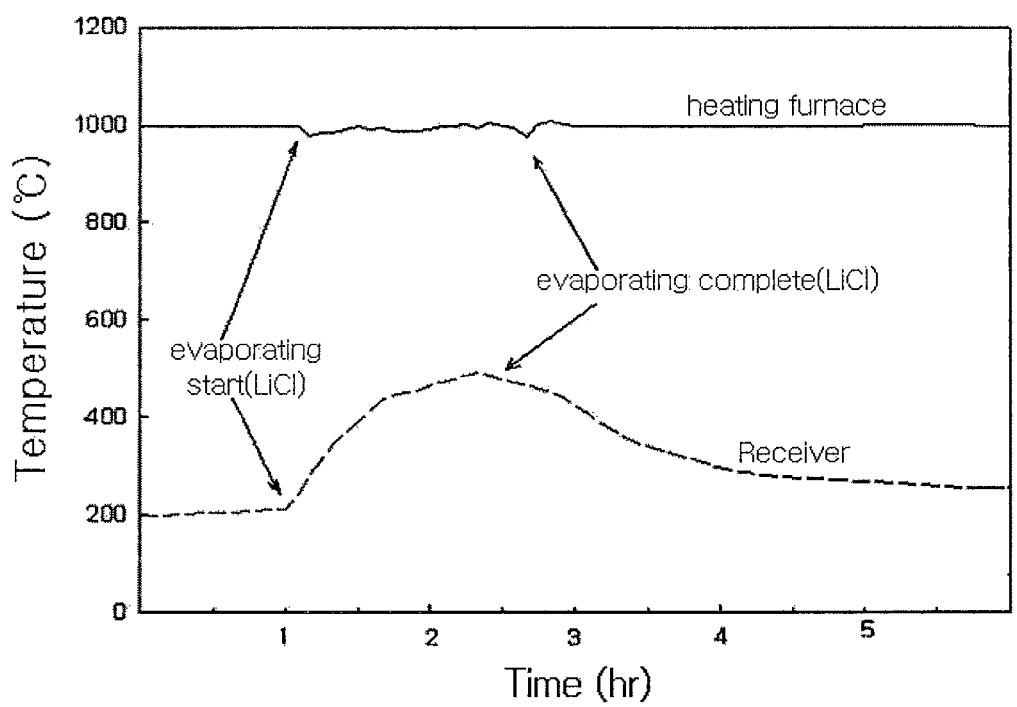
FIG. 3 is a graph illustrating temperature variations with time in a process using an apparatus for recovering residual salt from the reduced uranium metal according to an embodiment of the present invention.

FIG. 3 is a graph illustrating temperature variations with time in a process using an apparatus for recovering residual salt from the reduced uranium metal according to an embodiment of the present invention.

Referring to FIG. 3, an initial temperature of a heating furnace of the apparatus is about 1000° C., and an initial temperature of a receiver is about 200° C. LiCl melted at the temperature of about 1000° C. is evaporated by a vacuum pump to form LiCl vapor. While the LiCl vapor is moved upward through an evaporating pipe, a temperature of the receiver increases. When the evaporating of LiCl is completed, the temperature of the receiver decreases.

Figure 4:
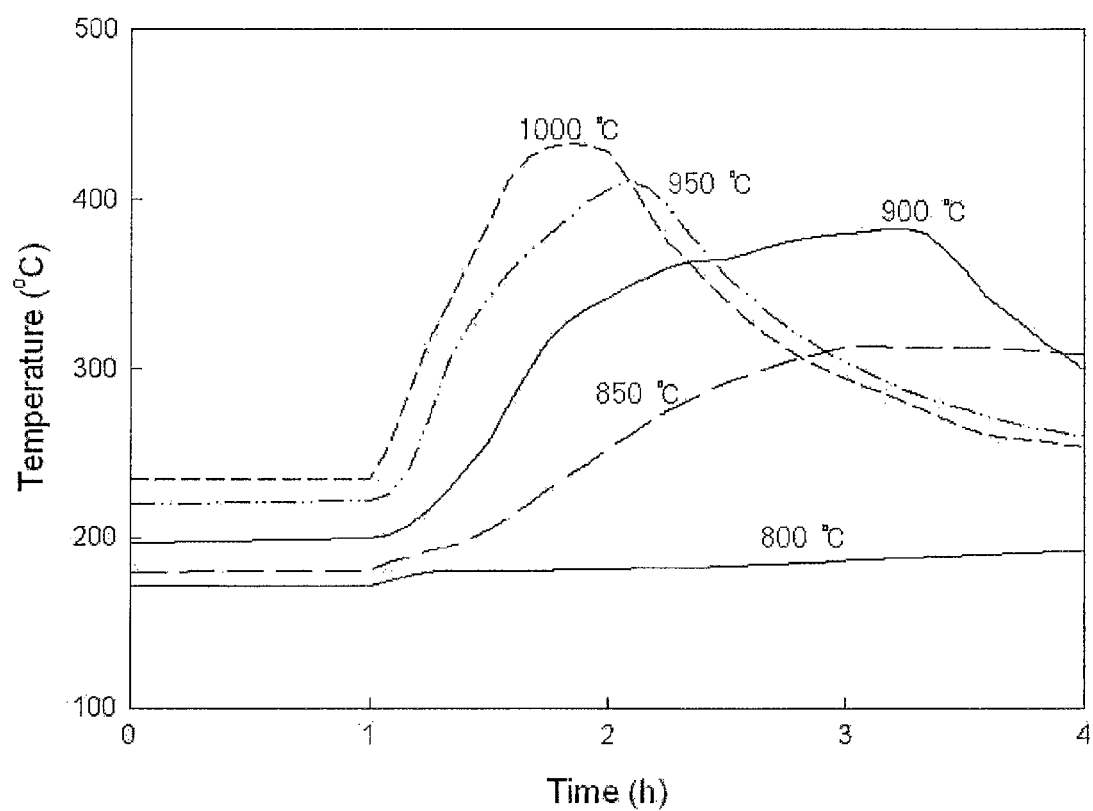
FIG. 4 is a graph illustrating temperature variations of a receiver with time in a process using an apparatus for recovering residual salt from the reduced uranium metal according to an embodiment of the present invention.

FIG. 4 is a graph illustrating temperature variations of a receiver with time in a process using an apparatus for recovering residual salt from the reduced uranium metal according to an embodiment of the present invention.

Referring to FIG. 4, as a heating temperature for the residual molten salt increases, a temperature of a receiver increases. In addition, as the heating temperature for the residual molten salt decreases, a time taken for evaporating the residual molten salt is increased.

Figure 5:
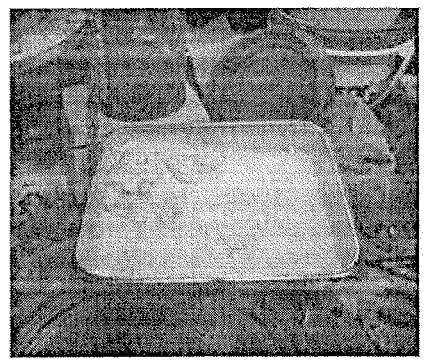
FIG. 5A is an image illustrating LiCl powder recovered from an apparatus for recovering residual salt from the reduced uranium metal according to an embodiment of the present invention.
FIG. 5B is a graph illustrating a result of an X-ray diffraction (XRD) analysis of the recovered LiCl powder of FIG. 5A.
Figure 5:
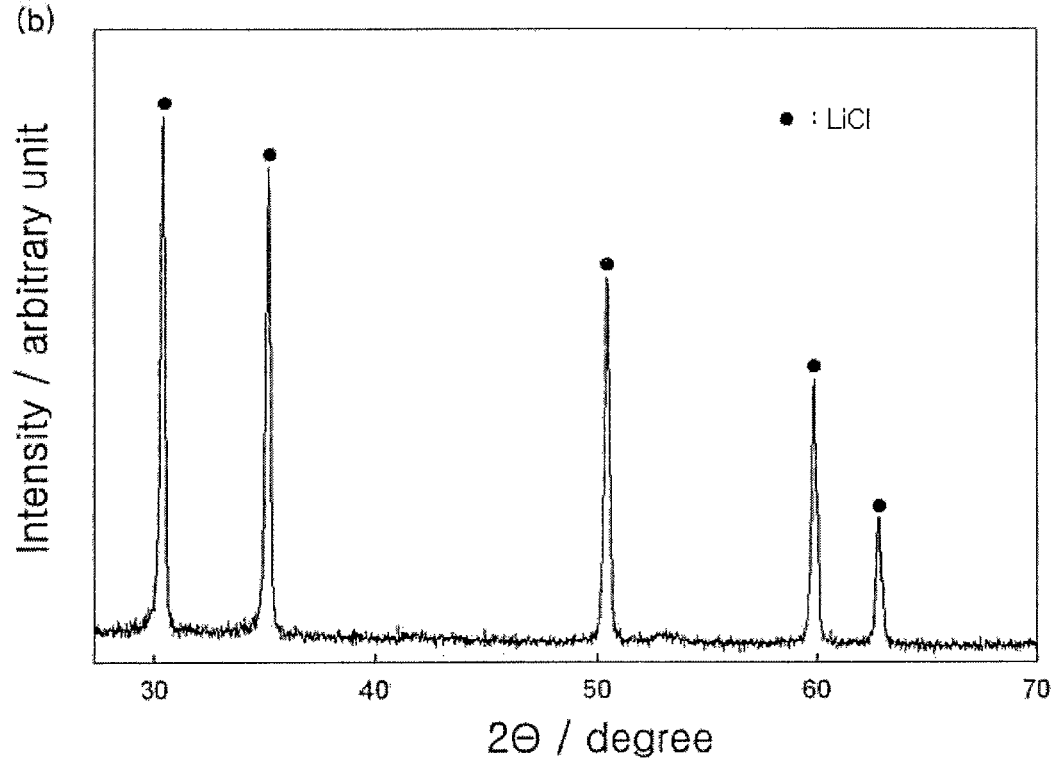

FIG. 5A is an image illustrating LiCl powder recovered from an apparatus for recovering residual salt from the reduced uranium metal according to an embodiment of the present invention. FIG. 5B is a graph illustrating a result of an X-ray diffraction (XRD) analysis of the recovered LiCl powder of FIG. 5A.

Referring to FIG. 5B, the result of the XRD analysis shows that LiCl is recovered using the apparatus.

Recovery rates of LiCl powder recovered using an apparatus for recovering residual salt from the reduced uranium metal according to an embodiment of the present invention, and states of the recovered LiCl powder are shown in Tables 1 and 2.

TABLE 1

| Repeating Number of Process | Evaporation Rate (%) | Recovery Rate (%) |
| --- | --- | --- |
| 1 | 100 | 92 |
| 2 | 100 | 98 |
| 3 | 100 | 102 |
| 4 | 100 | 100 |
| 5 | 100 | 100 |

As shown in Table 1, as the number of times of repeating a recovery process using the apparatus increases, the recovery rate increases. The recovery rate greater than 100% means that powder left in a previous process is recovered.

TABLE 2

| Evaporation Temperature (° C.) | Powder (%) | Melt Crystals (%) |
| --- | --- | --- |
| 850 | 90 | 10 |
| 900 | 65 | 35 |
| 1000 | 55 | 45 |

As shown in Table 2, 90% of LiCl evaporated at 850° C. is powder, and 10% thereof is melt crystals. As an evaporation temperature increases, the amount of powder decreases, and the amount of melt crystals increases.

According to the embodiments, mixed molten salt including LiCl is distilled at high temperature and low pressure to form LiCl vapor, and the LiCl vapor is quickly cooled below the melting point thereof to transform pure LiCl powder. Accordingly, molten salt of LiCl can be removed from a uranium metal reduced from a spent nuclear fuel.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An apparatus for recovering residual salt from a reduced uranium metal, the apparatus comprising:
   an evaporating chamber accommodating mixed molten salt or a reduced uranium metal;
   a heating furnace surrounding the evaporating chamber to heat the mixed molten salt in the evaporating chamber;
   an insulator disposed over the evaporating chamber to block heat generated from the evaporating chamber, and including an evaporating pipe in a center thereof to move vapor generated from the evaporating chamber;
   a receiver disposed over the insulator to collect powder formed by condensing and solidifying vapor passing through the evaporating pipe;
   a condenser disposed over the receiver to prevent the vapor passing through the evaporating pipe from leaking out of the apparatus;
   a vacuum pump connected with the condenser to depressurize the mixed molten salt; and
   cone-shaped baffles disposed in an upper portion of the condenser, the cone shaped baffles being configured to prevent powder from being formed on an upper end of the condenser and to sufficiently cool vapor generated from the evaporating chamber to prevent the vapor from arriving at the vacuum pump,
   wherein the condenser is provided with a pipe to connect the vacuum pump to the condenser, and
   wherein the receiver and the condenser are removable from the apparatus for recovery and collection of condensed residual salt.

2. The apparatus as set forth in claim 1, wherein the mixed molten salt or the reduced uranium metal comprises lithium chloride (LiCl).

3. The apparatus as set forth in claim 1, wherein the evaporating chamber comprises a thermocouple to measure a temperature of the evaporating chamber.

4. The apparatus as set forth in claim 1, wherein the evaporating chamber comprises a container containing the mixed molten salt.

5. The apparatus as set forth in claim 1, wherein the receiver comprises a thermocouple to measure a temperature of the receiver.

6. The apparatus as set forth in claim 1, wherein the vacuum pump is provided with a valve to control a movement of vapor by a predetermined degree of vacuum (pressure).

7. The apparatus as set forth in claim 1, wherein the pipe comprises a pressure gauge and a filter.

8. The apparatus as set forth in claim 1, further comprising a glove box to recover powder collected within the receiver in inert atmosphere.

9. The apparatus as set forth in claim 1, wherein the condensed residual salt comprises lithium chloride (LiCl).

* * * * *